United States Patent [19]

Weaver et al.

[11] 4,379,801

[45] Apr. 12, 1983

[54] STAMPABLE REINFORCED THERMOPLASTIC POLYESTER SHEETS

[75] Inventors: James C. Weaver; Robert W. Seymour, both of Kingsport, Tenn.

[73] Assignee: Eastman Kodak Company, Rochester, N.Y.

[21] Appl. No.: 370,318

[22] Filed: Apr. 21, 1982

[51] Int. Cl.[3] ........................ B32B 15/00; B32B 17/00

[52] U.S. Cl. .................................... 428/220; 428/283; 428/285; 428/288; 428/325; 428/328; 428/331; 428/341; 428/480; 428/482; 428/483

[58] Field of Search ............... 428/283, 285, 288, 341, 428/480, 482, 483, 220, 325, 331, 328

[56] References Cited

U.S. PATENT DOCUMENTS 4,302,499 11/1981 Grisch ................................ 428/285

*Primary Examiner*—Marion McCamish

*Attorney, Agent, or Firm*—Malcolm G. Dunn; Daniel B. Reece, III

[57] ABSTRACT

Stampable sheet of reinforced thermoplastic material having a plurality of layers of polymeric material and a plurality of layers of fibrous reinforcing material alternating with the layers of polymeric material, the polymeric material layers having minimum crystallization half-time upon heating of one minute or less and the polymeric material layer inwardly of the outer polymeric material layers and contiguous to a surfacing mat layer having a shrinkage of less than 2% as determined in accordance with ASTM Method D-955; with all of the layers being integrally formed together and possessing a smooth surface, essentially free of fiber "read-through", and of the type required of exterior automotive-type appearance parts; and a stamped sheet formed from the stampable sheet and having a heat deflection temperature under 264 psi load greater than $T_m$-50° C. wherein $T_m$ is the melting point of the outer layers of the sheet.

12 Claims, No Drawings

STAMPABLE REINFORCED THERMOPLASTIC POLYESTER SHEETS

DESCRIPTION

FIELD OF THE INVENTION

Our invention relates to stampable thermoplastic polyester sheets and particularly to glass-reinforced thermoplastic sheets of laminate or composite construction for forming automotive parts as well as for other applications, the forming being accomplished by the use of various sheet metal forming techniques, such as by stamping apparatus; and to stamped sheets from the stampable reinforced thermoplastic polyester sheets; both the stampable sheet and the stamped sheet having at least one smooth outer surface essentially free of fiber "read-through".

Automotive companies have been changing from the use of die-cast metal to the use of reinforced plastics for many different parts of an automobile in order to take advantage of the resulting reduced weight. For large parts these reinforced plastics have been in the form of sheet molding compounds (SMC) which are based on thermoset resins which require a chemical reaction to occur in order to cure the plastic. Generally the forming equipment requires apparatus more simple than that required to injection mold parts of comparable size. Many disadvantages exist, however, such as long cycle time in order to cure the thermoset resin, poor surface finish and complexity of resin compositions.

BACKGROUND OF THE INVENTION

Representative, for instance, of some kinds of development activities occurring in the past 10 years for reducing the weight of automobiles and thereby enabling the autoist to be more conservative of fuel, would appear to be the following.

According to the May 1969 issue to "Autoproducts", the G.R.T.L. Company, a joint development venture of PPG Industries, Inc. and Union Carbide Corporation, was formed (about 1968) to produce a family of glass-reinforced thermoplastic sheets called "Azdel" which could be formed on conventional metal-stamping apparatus for the purpose of meeting the automobile industry's need for high-speed productivity, for example 180 to 360 parts per hour with a single press. The Azdel glass-reinforced thermoplastic sheet can be formed in one operation into shapes that take four or more separate stamping operations when working with a sheet of steel. The Azdel sheet made from polypropylene is preheated in an infrared oven to about 400° F. (about 204° C.) then fed into a press and formed between cooled matched metal dies. The operation, according to the article, is scrap-free and as the stamped Azdel sheet comes from the mold it has no flash or trim, and holes and notches can be formed in the stamping operation. Shapes can be stamped from Azdel sheets that would be impossible in steel; and in some cases an assembly of several parts in steel can be redesigned so that it can be made in one part from an Azdel sheet.

Also according to the Jan. 22, 1968 issue of "Chemical and Engineering News", the Azdel glass-reinforced thermoplastic sheets reportedly could be made from styrene acrylonitrile copolymer (42% glass reinforced), polyvinyl chloride (36% glass reinforced), polypropylene (44% glass reinforced) or other resins. The Azdel sheet contains generally about 40% glass fiber by weight. Reinforced polypropylene has a heat distortion temperature of 327° F. (about 164° C.); styrene acrylonitrile copolymer, 255° F. (about 124° C.); and polyvinylchloride, 221° F. (about 105° C.). A given part can be formed from a variety of blank sizes, such as an 84 mil thick hood can be formed from a 150 mil thick by 100 sq. in. blank or from a 125 mil thick by 121 sq. in. blank ("SPE Journal", September 1972, Vol. 28, pages 38–42).

Further, in the September 1976 issue of "Plastics World", page 53, there was a later announcement that a new grade of Azdel sheet based on PBT (polybutylene terephthalate) thermoplastic polyester reinforced with 30 weight percent of continuous glass fiber mat was being offered. These Azdel sheets were formed in a stamping operation after being preheated to 450° F. to 500° F. (about 232° C. to about 260° C.).

Allied Chemical Corporation, for instance, produces a stampable nylon 6 composite sheet which is registered under the name STX, and has a combination of about 50% nylon 6 resin, about 30% glass fiber reinforcements and about 20% fillers. The composite sheet must be heated to a temperature above its melting point before it can be stamp formed, according to an article in the March 1979 issue of "Plastics Engineering" (pages 47–49).

In every instance mentioned above, the preheating of the composite sheet apparently has to take place at or above the melting point of the thermoplastic material being used in the sheet. Such heating, of course, requires that a significant amount of energy be used for each sheet. Also heating at or above the melting point means that greater care must be exercised in transporting a sheet in its melt or above-melt state as from the infrared oven to the forming or stamping press.

One thermoplastic material that does not appear to be given as much mention in the literature for structural purposes as other thermoplastic materials is the polyester, poly(ethylene terephthalate). It is noted, for instance, in U.S. Pat. No. 3,547,891 that there is disclosed a thin film material or sheet material (about 7.5 to 10 mils in thickness) of poly(ethylene terephthalate), that has been vacuum heat formed, starting and ending essentially in the amorphous state. This amorphous final state would apparently be suitable for the final product, as for use in blister packages, as mentioned in the patent, but not for use in the final form of automobile parts. Another patent, U.S. Pat. No. 3,496,143, discloses a process for vacuum deep-drawing of poly(ethylene terephthalate) sheet material, which must have a solution viscosity [as determined in a 1% solution of the poly(ethylene terephthalate) in meta-cresol at 25° C.] of about 1.7 to about 2.0 and a degree of crystallization of at least 5% up to about 25%. Neither this sheet material nor the one disclosed in U.S. Pat. No. 3,547,891 is a reinforced material or one of laminate construction. U.S. Pat. No. 3,496,143 specifies that its vacuum-formed product is not amorphous and that it has a higher degree of crystallinity than the initial material being molded; the molded material also being considered as having a degree of crystallinity in the range of 5% to 25%.

U.S. Pat. No. 3,765,998 discloses a high-impact resin sheet which is formable in shaping apparatus held at ambient temperature and concerns a glass mat having a glass fiber length of at least one inch, impregnated with poly(ethylene terephthalate) having a weight average molecular weight from about 5,000 to about 45,000. The sheets are preheated from about 240° C. to about 280° C. and are then transferred to a mold or press where they are cooled slowly under pressure to develop crystallinity (Examples 1 through 8). Examples 9 and 10 speak of chilling the laminate sheet, but since there is no indication of the rate of chilling taking place, the state of crystallinity cannot be determined. In any event the patent teaches preheating to around the melt temperature for all examples. There is an indication in the specification that the "PET" [poly(ethylene terephthalate)] polymer has a level of crystallinity of from about 20% to about 60% as determined by X-ray techniques (column 3, lines 51-57), but it is not clear whether or not this statement has reference to the polymer in the pellet form prior to impregnation into the sheet or to the polymer when in the sheet form.

An advantage of the use of thermoplastic resin instead of the thermoset resin is that the former need only to cool below its crystallization temperature before a stamping press can be reopened and the part removed. A thermoset resin part must be given time for a chemical reaction to occur in order to cure the part before it can be removed from a stamping press.

Another advantage is that a thermoplastic part can be recycled, if need be, by reheating, whereas a thermoset part cannot be recycled by reheating.

U.S. Pat. No. 4,263,364 discloses reinforced thermoplastic polyester sheets which can be rapidly quenched from the melt to a stable amorphous state. The quenched, amorphous sheets may then be stamp-formed at temperatures that are below the melting point ($T_m$) of the polyester but above its glass transition ($T_g$) temperature, or the quenched amorphous sheets may be stored and then stamp-formed at another time. In this manner, therefore, considerable energy will be saved as compared to some of the other prior art processes mentioned above involving the necessity of heating to or above the melt temperature of the polymer involved. Also the sheet may be more easily handled in moving it to a forming or stamping apparatus than one heated at or above the melt temperature. Further, flat amorphous sheets can be stored indefinitely at ambient temperatures until needed and then transported to a forming or stamping press. The resulting formed or stamped part retains the shape of the mold in the press and possesses an overall high set of properties such as surface appearance, heat distortion temperature, flexural and impact strength which qualify it for use in both appearance and structural applications. The resulting sheet will thus find utility in such applications as exterior automotive parts, which are exposed to elevated paint oven temperatures.

The reinforced thermoplastic polyester sheet thus may be produced and then reduced to an amorphous state and subsequently stamped and crystallized simultaneously at a temperature below the melting point of the polyester but above the glass transition temperature. The reinforced stampable thermoplastic polyester sheet of laminate construction has a center layer or layers which is or are comprised of a more slowly crystallizing polymer than the outer layers of the sheet. This construction reduces the need to rapidly quench the core of the sheet so as to form the amorphous sheet and thus enables higher production rates and the production of thicker amorphous sheets.

Some essential requirements of a stampable sheet that is to be used for exterior automotive-type appearance parts are that the sheet have a smooth surface and that it is essentially free of fiber "read-through". The latter occurs when the polymer layer above the layer of fibrous reinforcement, such as glass fiber reinforcement, crystallizes so fast that it shrinks around the glass fibers and pulls on them, thus resulting in a "read-through" of the fibers. Some polymers, however, which are effective in reducing or eliminating fiber "read-through" when used as layers in the sheet can also cause a blistering of the surface to appear in the formed part. Such blisters represent another type of surface defect which must be avoided. Thus, sheet compositions are needed in which fiber "read-through" is eliminated and in which no blistering occurs during operations connected with forming a part from the stampable sheet.

An object of the invention, therefore, is to produce a stampable sheet which is subsequently stamped into parts which are highly crystalline and suitable for painting and baking and may be used for exterior automotive panels, the sheet being characterized by a smooth, glossy surface, an absence of fiber read-through, and high mechanical properties including a high heat deflection temperature.

Another object is to provide a stamped sheet from the stampable sheet, the stamped sheet having a heat deflection temperature under 264 psi. load greater than $T_m-50°$ C. where $T_m$ is the melting point of the outer layers of the sheet.

As mentioned above, the use of some polymers in the layers of a reinforced thermoplastic polyester sheet will, upon being subjected to heat in an infrared oven for subsequent stamping or forming of the sheet, result in blistering of that layer or layers in the formed part. This blistering also undesirably extends up through the sheet and is revealed on the surface of the sheet.

Still another object, therefore, is to provide a stamped sheet from the stampable sheet that is free from blistering. Other objects inherent in the nature of the invention will become apparent to those skilled in the art to which this invention pertains.

DISCLOSURE OF THE INVENTION

In accordance with the present invention, we provide a stampable sheet of reinforced thermoplastic material having on at least one surface of the sheet a smooth surface suitable for use as exterior automotive panels and the like, the sheet having a plurality of layers of polymeric material and a plurality of layers of fibrous reinforcing material alternating with the layers of polymeric material, all of the layers being integrally formed together.

The outer layers of the sheet are of a crystallizable material selected from poly(ethylene terephthalate), copolymers of poly(ethylene terephthalate) and blends thereof, poly(1,4-cyclohexanedimethylene terephthalate), copolymers of poly(1,4-cyclohexanedimethylene terephthalate) and blends thereof having a minimum crystallization half-time upon heating of one minute or less, the minimum crystallization half-time being that measured with respect to each individual layer of the outer layers.

A layer of a surfacing mat of fine stranded glass of continuous filaments randomly patterned, having a weight of about 0.1 to about 0.4 ounce per square foot, is positioned contiguously with respect to one of the outer layers of the sheet.

Then a layer of polymeric material is positioned contiguously with the side of the surfacing layer opposite from the aforementioned one outer layer of the stampable sheet, and has a shrinkage of less than about 2%, as determined in accordance with ASTM Method D-955, and a minimum crystallization half-time of one minute or less. This layer of polymeric material may be selected from a. copolymers of poly(1,4-cyclohexylenedimethylene 1,4-cyclohexanedicarboxylate) with about 10 to about 30 mole percent dimer acid;
b. a polyetherester comprised of
   1. a dicarboxylic acid component comprised of
      A. 100 to 60 mole percent terephthalic acid, and
      B. 0 to 40 mole percent of an aliphatic or aromatic dicarboxylic acid having a molecular weight of less than 300, and
   2. a diol component comprised of
      A. a glycol comprised of 100 to 60 mole percent tetramethylene glycol and 0 to 40 mole percent of an aliphatic or aromatic glycol having a molecular weight of less than 300, and
      B. 10 to 60 weight percent, based on the weight of the polyetherester, of a poly(alkylene oxide) glycol having 2, 3 or 4 carbon atoms in the repeating unit and having a molecular weight in the range of 400 to 5000, wherein the sum of the total mole percent amount of aliphatic or aromatic dicarboxylic acid having a molecular weight of less than 300 in item b.1.B., the mole percent amount of aliphatic or aromatic glycol having a molecular weight of less than 300 in item b.2.A., and the weight percent, based on the weight of the polyetherester, of the poly(alkylene oxide) glycol in item b.2.B equals at least 25 but does not exceed 80;
c. a polyetherester comprised of
   1. a dicarboxylic acid component comprised of
      A. 100 to 98 mole percent terephthalic acid, and
      B. 0 to 2 mole percent of a trifunctional carboxylic acid of molecular weight less than 300;
   2. a diol component comprised of
      A. a glycol comprised of 90–60 mole percent 1,4-cyclohexanedimethanol and 10 to 40 mole percent ethylene glycol or tetramethylene glycol, and
      B. 10 to 50 weight percent, based on the weight of the polyetherester, of a poly(alkylene oxide)-glycol having 2 to 4 carbon atoms in the repeating unit and having a molecular weight in the range of 400 to 2000;
d. a polyetherester comprised of
   1. a dicarboxylic acid component comprised of
      A. 100 to 98 mole percent 1,4-cyclohexanedicarboxylic acid and
      B. 0 to 2 mole percent of a trifunctional carboxylic acid of molecular weight less than 300;
   2. a diol component comprised of
      A. 1,4-cyclohexanedimethanol and
      B. 10 to 60 weight percent, based on the weight of the polyetherester, of a poly(alkylene oxide)-glycol having 2 to 4 carbon atoms and a molecular weight in the range of 400 to 2000.

The outer layers of the sheet are of a crystallizable material selected from (1) poly(ethylene terephthalate) such as having an inherent viscosity (I.V.) of about 0.4 to about 0.9; (2) copolymers of poly(ethylene terephthalate) having about 5 mole percent or less of 1,4-cyclohexanedimethanol, neopentyl glycol, butylene glycol, 2,2,4,4-tetramethyl-1,3-cyclobutane diol, bisphenol A, propylene glycol, diethylene glycol, hexamethylene glycol, isophthalic acid, adipic acid, or 1,4-cyclohexanedicarboxylic acid; (3) poly(1,4-cyclohexylenedimethylene terephthalate); (4) copolymers of poly(1,4-cyclohexylenedimethylene terephthalate) having about 20 mole percent or less of ethylene glycol, neopentyl glycol, butylene glycol, 2,2,4,4-tetramethyl-1,3-cyclobutanediol, bisphenol A, propylene glycol, diethylene glycol, hexamethylene glycol, isophthalic acid, adipic acid, or 1,4-cyclohexanedicarboxylic acid; (5) blends of poly(ethylene terephthalate) with 35 weight percent or less of the polymers and copolymers of items (2), (3) or (4) above; and (6) blends of poly(1,4-cyclohexylenedimethylene terephthalate) with 35 weight percent or less of the polymers and copolymers of items (1), (2) or (4) above; having a minimum crystalization half-time upon heating of one minute or less, the minimum crystallization half-time being that measured with respect to each individual layer of the outer layers.

In copolymers and blends of poly(ethylene terephthalate) and poly(1,4-cyclohexylenedimethylene terephthalate) [items (2), (4), (5) and (6)], the minimum crystallization half-time will depend upon the composition, the inherent viscosity, the catalyst system used, the presence of inert fillers and, possibly, the presence of impurities. For example, poly(1,4-cyclohexylenedimethylene terephthalate) copolymerized with 5 mole percent ethylene glycol has a minimum crystallization half-time of about 40 seconds, whereas that copolymerized with 26 mole percent ethylene glycol has a minimum crystallization half-time of three minutes. Also, the inherent viscosity, being a measure of molecular weight, affects the crystallization half-time, the minimum crystallization half-time becoming greater as the inherent viscosity increases. For example, poly(ethylene terephthalate) copolymerized with about 5 mole percent 1,4-cyclohexanedimethanol has a minimum crystallization half-time of one minute when the I.V. is about 0.6, but this increases to two minutes if the I.V. is about 0.75. Further, depending upon their ability to initiate crystallization, such materials as inert fillers, catalyst metals and impurities may also serve to decrease the minimum crystallization half-time at a given composition and inherent viscosity.

"Surfacing mats" or "surfacing veils", as identified and claimed herein, are lightweight fiber glass mats varying in thickness from about 10 to about 30 mils, with the filament diameters generally averaging about 17 microns. As pointed out in the *Handbook of Fillers and Reinforcements for Plastics* (1978), Van Nostrand Reinhold Company, on page 476, surfacing mats or veil mats have been applied to the inside of wet-layup composites, such as tanks and the like, to provide a resin-rich, chemical resistant layer and to protect the underlying reinforcement layers. They are also employed as a surface covering in press-molded items, preventing the reinforcing fiber pattern from appearing in the prism molded exterior. As used in this invention, the surfacing mat or veil is not intended to perform a reinforcing function, although some modicum of reinforcement may result, but rather the surfacing mat or veil is intended to block the general flow-through or interchange of polymers, i.e., to keep the polymers on one side thereof substantially insulated from the polymers on the opposite side of the surfacing mat or veil, despite the pressure that would otherwise cause such flow as a result of the compression applied to form the sheet. In this manner the physical characteristics of one polymeric layer on one side of the surfacing mat will be substantially undiminished by any flow-through or exchange with the polymeric material of the layer on the opposite side of the surfacing mat or veil. Also although surface smoothness is improved with the aid of a surfacing mat, there is still some fiber read-through due to the effects of the pressure applied when the sheet is being formed under compression. Therefore, the particular polymers shown herein as being selected for positioning contiguous to the surfacing mat on the side of the surfacing mat opposite from the outer polymeric layer will shrink less around the coarse fibers of the reinforcing mat. These fibers, then, will not show through the surfacing mat. The surfacing mat thus contains the lower shrinking polymers from flowing through and thus diminishing their ability to "hide" the coarser fibers. It will be noted from an example given herein that when the lower shrinking polymer was omitted, even though the surfacing mat was present, there was observed visual read-through of the reinforcing mat. Thus the surfacing mat and the lower shrinking polymer cooperate to provide the desired surface sought for as in exterior automotive panels and the like.

Owens-Corning Fiberglas, for instance, makes a surfacing mat identified as M-514 Surfacing Mat. Nicofibers, Inc. makes a fiber glass surfacing mat called "SURMAT", which is a highly uniform, randomly patterned continuous-filament mat. SURMAT "100" is still another example of a surfacing mat. For a mat that has a 20 mil thickness, the average weight per square foot is 7.4 grams or about ¼ ounce; and for a mat having a 30 mil thickness, the average weight per square foot is 9.7 grams of about ⅓ ounce. The filament diameters are about 21 microns.

Item (c) above in the stampable sheet may comprise poly(about 70 to about 75 mole percent/about 30 to about 25 mole percent 1,4-cyclohexylenedimethylene/-butylene terephthalate) modified with about 28 to about 33 weight percent poly(oxytetramethylene) of molecular weight 1000.

Item (c) above in the stampable sheet may also comprise poly(about 70 to about 75 mole percent/about 30 to about 25 mole percent 1,4-cyclohexylenedimethylene/butylene terephthalate) modified with about 0.5 to about 0.8 mole percent (based on the acid component present) trimellitic anhydride and about 28 to about 33 weight percent poly(oxytetramethylene) of molecular weight 1000.

Item (d) above in the stampable sheet may comprise poly(1,4-cyclohexylenedimethylene 1,4-cyclohexanedicarboxylate) modified with about 0.25 to about 0.75 mole percent (based on the acid component present) trimellitic anhydride and about 22 to about 28 weight percent poly(oxytetramethylene) of molecular weight 1000.

The layer of polymeric material contiguous to the one side of the surfacing mat may also have about 5 to about 50% by weight fillers selected from chopped strands of fiber glass of length less than about ¼ inch, milled glass, glass spheres, novacite, talc, mica, calcium carbonate, barium sulfate, and kaolin.

The reinforcing mats are preferably made from fiber glass of continuous strand, such as of high end count roving, laid down in an overlapping swirl pattern to provide high mat uniformity, such as M-8610 Series from Owens-Corning Fiberglas, which may range from about 1 ounce to about 3 ounces per square foot. The function of the reinforcing mat is to provide strength, such as in tensile, flexural and impact strength properties; dimensional stability to hold form and shape under severe mechanical and environmental stresses; and heat resistance to the composite; to mention only a few results from the use of such reinforcing mats.

The overall thickness of the stampable sheet may range from about 40 to about 250 mils, and the layers of glass fiber may comprise about 20 to about 50% by weight of the stampable sheet.

The overall thickness of the stampable sheet may also range from about 50 to about 150 mils, and the layers of glass fiber may comprise about 20 to about 50 percent by weight of the stampable sheet.

The overall thickness of the stampable sheet may further range from about 60 to about 100 mils, and the layers of glass fiber may comprise about 30 to about 40% by weight of the stampable sheet.

The stamped sheet of reinforced material from the stampable sheet described above preferably has a heat deflection temperature under 264 psi. load greater than $T_m$-50° C. where $T_m$ is the melting point of the outer layers of the sheet. The layers of fibrous reinforcing material of the stamped sheet may be comprised of glass fibers.

The polymeric layer positioned contiguously with the side of the surfacing mat opposite from the one outer layer of the stampable sheet may preferably be poly(about 70 to about 75 mole percent/about 30 to 25 mole percent 1,4-cyclohexylenedimethylene/butylene terphthalate) modified with about 0.5 to about 0.8 mole percent (based on the acid component present) trimellitic anhydride and about 28 to about 33 weight percent poly(oxytetramethylene) of molecular weight 1000. Still more preferably the polymeric material will contain about 5 to about 50% by weight fillers selected from chopped strands of fiber glass of length less than about ¼ inch, milled glass, glass spheres, novacite, talc, mica, calcium carbonate, barium sulfate and kaolin. Preferably the filler selected will be the chopped strands of fiber glass of length less than about ¼ inch.

The crystallization half-time is defined as the length of time required at a given temperature for an originally amorphous polymer sample to crystallize 50% of the amount to which it eventually crystallizes at that temperature. For example, poly(ethylene terephthalate) crystallizes at about 60% at 180° C. and never 100%. Thus only 50% of 60%, or 30%, crystallinity is obtained after one crystallization half-time. The minimum crystallization half-time is that half-time which corresponds to the minimum point of the curve when half-time is plotted against temperature.

Values reported as "crystallization half-times" are measured in the following manner. A sample of the polyester is placed in the sample pan of a Perkin-Elmer DSC-2 differential scanning calorimeter. An amount of fine mesh $Al_2O_3$ sufficient to minimize transient responses is placed in the reference pan. The sample is then heated to a temperature above the melting point of the polyester (for example about 285° C. for PET). When the sample is thoroughly melted, it is quickly cooled to the desired crystallization temperature and allowed to crystallize isothermally while the crystallization exotherm is recorded as a function of time. Zero time is taken as the moment at which the instrument reaches the chosen crystallization temperature. The exothermic response as recorded by the instrument will pass through a maximum and the time at which that maximum occurs is a good approximation of the crystallization half-time. For the purposes of these measurements, the time at the maximum will be taken as equivalent to the crystallization half-time. The minimum crystallization half-time is found by performing the above experiment at a number of crystallization temperatures and plotting the half-times as a function of crystallization temperature. This curve will pass through a minimum and the half-time at that minimum is the minimum crystallization half-time.

The polyester material may comprise polyesters having inherent viscosities of about 0.3 to about 1.5; inherent viscosity being determined by a concentration of 0.5 grams polymer in 100 milliliters of solvent (60 percent by weight phenol and 40 percent by weight tetrachloroethane), the polymer being dissolved at 125° C. and being measured at 25° C.

BEST MODE FOR CARRYING OUT THE INVENTION

Reinforced sheets are made by laminating alternating layers of polymer film and reinforcing fiber glass mat by heating in a compression press or continuous laminating press to temperatures of 260° C. or higher. The sheet is cooled under pressure. In the present invention, the reinforced sheet has at least one layer of a glass mat of such density as to impart reinforcement to the sheet, one layer of a fine stranded glass mat referred to in the trade as a surfacing mat or veil, one layer of a material located between the top layer of reinforcing material or glass mat and the surfacing mat or veil, and finally two outer layers of polyester-based material. The outer layers comprise polyesters which will crystallize more fully under the conditions used to stamp the final part.

For purposes of stamping, the sheets are formed and held in a mold until the outer layers of the resulting part become crystalline, causing the sheet to retain the shape of the mold.

The reinforced sheet containing at least one layer of reinforcing mat and one layer of surfacing mat, the latter contributing an insignificant amount to the degree of reinforcement, gives an overall composition of 20 to 50% reinforcement.

The following examples are intended only to illustrate the invention since numerous variations and modifications will be apparent to those skilled in the art.

EXAMPLE 1

Poly(ethylene terephthalate) film (PET), inherent viscosity (I.V.) 0.67, minimum crystallization half-time=40 seconds, 10 and 30 mil thickness; poly(73/27 1,4-cyclohexylenedimethylene/butylene terephthalate) modified with 32 weight percent poly(oxytetramethylene of molecular weight 1000 film [abbreviated "(CHDMT)-based polyetherester"], I.V. 1.2, having a shrinkage of less than about 2%, as determined in accordance with ASTM Method D-955, a minimum crystallization half-time 20 seconds, 30 mil thickness; Owens-Corning Fiberglas M-8610 continuous strand 2 oz./sq. ft.; and Owens-Corning Fiberglas M-514 surfacing mat, 0.020 in. thickness, were cut into pieces 8 in.×8 in. For the control composition, "A", beginning with an outer layer of 30 mil PET film, alternating layers of film and reinforcing mat were placed in a compression molding die measuring 117 mil×8 in.×8 in. to produce a composite as illustrated below:

| | | |
|---|---|---|
| A. | ------------------------ | 30 mil PET |
| | xxxxxxxxxxxxxxx | reinforcing glass mat |
| | ------------------------ | 50 mil PET |
| | xxxxxxxxxxxxxxx | reinforcing glass mat |

-continued

| | |
|---|---|
| ------------------------ | 30 mil PET |

For composition "B", a surfacing mat was placed immediately below the outer PET film and one layer of (CHDMT)-based polyetherester was placed between the surfacing glass mat and the outer layer of reinforcing glass mat as illustrated below:

| | | |
|---|---|---|
| B. | ------------------------ | 30 mil PET |
| | ~~~~~~~~~~ | surfacing glass mat |
| | ------------------------ | 30 mil (CHDMT)-based polyetherester |
| | xxxxxxxxxxxxxxx | reinforcing glass mat |
| | ------------------------ | 20 mil PET |
| | xxxxxxxxxxxxxxx | reinforcing glass mat |
| | ------------------------ | 30 mil PET |

Each composition in turn was placed between two metal plates and inserted in a Wabash compression molding press preheated to 270° C. Slight pressure was applied to the composite until the polymer began to flow. Maximum pressure of 24 tons on a three-inch diameter ram was then applied to the composite for two minutes.

To prepare samples for inspection and testing purposes, the composites were cooled gradually under pressure in the press to below 69° C. (the $T_g$ of PET) to afford crystallization. ASTM specimens were cut from the crystalline sheets and tested.

The crystallized all-PET sheet, composition "A", contained 30 weight percent glass reinforcement. It possessed high strength properties, specifically flexural and impact strength, and a high heat distortion temperature (Table 1). However, fiber "read-through" was visually evident, giving a rough surface unsuitable for exterior appearance parts.

The crystallized PET sheet containing the (CHDMT)-based polyetherester layer situated between a surfacing and a reinforcing mat, composition "B", also contained 30 weight percent glass reinforcement. It possessed a significantly lower density than composition "A" but maintained a high level of strength properties. The flexural modulus remained high, as did the heat distortion temperature (Table 1). Unexpectedly the surface was smooth and the coarse reinforcing mat was not visible.

TABLE 1

| | 30% Glass Mat Reinforced Sheets | |
|---|---|---|
| Property, Units | Composition "A" All PET | Composition "B" (CHDMT)-Based Polyetherester Between Surfacing and Reinforcing Mats |
| Specific gravity @ 23° C. ASTM D-792 | 1.60 | 1.49 |
| Deflection temp., °C. @ 264 psi ASTM D-790 | 250 | 240 |
| Flexural Modulus of elasticity, psi ASTM D-790 | 960,000 | 755,000 |
| Flexural strength psi ASTM D-790 | 21,500 | 17,300 |
| Tensile strength at fracture, psi ASTM D-638 | 16,500 | 10,000 |
| Notched Izod impact strength, ft.lb./in. | | |

TABLE 1-continued

| Property, Units | 30% Glass Mat Reinforced Sheets Composition "A" All PET | Composition "B" (CHDMT)-Based Polyetherester Between Surfacing and Reinforcing Mats |
|---|---|---|
| of notch @ 23° C. | | |
| ASTM D-256 | 11 | 10 |
| Unnotched Izod impact strength, ft.lb./in. of width @ 23° C. | | |
| ASTM D-256 | 16 | 13 |
| Hardness | | |
| R scale | 120 | 115 |
| L scale | 110 | 105 |
| M scale | 100 | 75 |
| ASTM D-785 | | |
| Fiber "read-through" | yes | no |
| Surface smoothness | no | yes |

EXAMPLE 2

A composition "C" was made such that the (CHDMT)-based polyetherester was omitted but a surfacing mat was placed immediately between the outer PET film and the outer layer of reinforcing glass mat as illustrated below:

| | | |
|---|---|---|
| C. | ----------------------- | 30 mil PET |
| | ∿∿∿∿∿∿∿∿∿∿ | surfacing glass mat |
| | xxxxxxxxxxxxxxx | reinforcing glass mat |
| | ----------------------- | 50 mil PET |
| | xxxxxxxxxxxxxxx | reinforcing glass mat |
| | ----------------------- | 30 mil PET |

The surface smoothness was improved over that of composition "A" but was not acceptable for exterior automotive applications because of the visual "read-through" of the reinforcing mat. This illustrates that the surfacing mat alone will not afford the unusually smooth surface of composition "B" and that the polymeric material having a shrinkage of less than 2% as determined in accordance with ASTM D-955 and a minimum crystallization half-time of one minute or less is required to obtain this effect.

EXAMPLE 3

Crystalline sheets of compositions "A" through "C" were primed with one layer of 1 mil taupe primer and baked in a forced-air oven for 30 minutes at 300° F. They were then painted with one layer of a 2 mil white automotive enamel and baked in a forced-air oven for 17 minutes at 265° F.

Fiber "read-through" in all compositions except "B" was evident. The surface of "B" immediately over the surfacing mat and (CHDMT)-based polyetherester layer was smooth, glossy and absent of fiber "read-through".

EXAMPLE 4

To demonstrate the advantages of these compositions in formability, a composition "D" was prepared as follows, in which the layer of (CHDMT)-based polyetherester in composition "B" was replaced with a 30 mil layer of copoly(69/31 ethylene terephthalate/1,4-cyclohexylenedimethylene terephthalate), abbreviated "copoly 69/31-1,4-CHDMT", I.V. 0.75. Copoly 69/31-1,4-CHDMT has a shrinkage of less than 2%, as determined in accordance with ASTM Method D-955, but a minimum crystallization half-time of 2650 min.

Sheets of compositions "B" and "D" were, in turn, heated rapidly into the melt (>260° C.) in an infrared oven. Heating was done for 36 seconds between banks of Fostoria infrared tubes. The limber, molten sheet was transferred rapidly to a match-mated mold in a compression molding press which had been preheated to 160° C. The mold was closed rapidly and the sheet formed and crystallized for one-half minute under pressure. The formed, crystallized part was removed from the mold.

While formed parts from neither compositions "B" nor "D" showed fiber "read-through" on the top surface, composition "D" showed blistering, where it appeared that the upper layer(s) had separated in some locations from the lower ones. Composition "B" did not show this undesirable result.

Permissible Variations

Although all of the examples have utilized two layers of 2 oz./sq. ft. reinforcing mat to minimize sheet thickness, it may be desirable to either omit the layer of polymeric material between the reinforcing mats and add as many layers of reinforcing mat back-to-back as needed, or use only one layer of reinforcing mat and vary its density as needed from about 1 to 4 oz./sq. ft. to obtain the level of reinforcement needed.

To avoid or control warpage, it may be desirable to produce a sheet of balanced construction. To accomplish this, one layer of surfacing mat with one layer of polymeric material having less than 2% shrinkage and a minimim crystallization half-time of one minute or less between it and the reinforcing mat underneath would be situated on both the top and bottom sides of the sheet.

The reinforcing glass mat plies may be oriented in different directions to orient the fiber lengths and obtain the desired property. In addition, combinations of different types of mats, such as continuous and chopped strand, may be used. Chopped random fibers and/or fillers may also be added between plies. Different types of mat and/or fibers may also be employed, such as synthetic polymeric materials or graphite.

It may be desirable that additives be incorporated in the polymeric plies to impart characteristics such as mold release, stability or flame retardancy.

The thickness of the overall sheet may range from about 40 mils to about 250 mils, preferably from about 50 mils to about 150 mils and still more preferably from about 60 mils to about 100 mils. Of this thickness, at least 10 mils but not more than 40% of the total thickness is composed of the layer having a shrinkage of less than 2%, as determined in accordance with ASTM Method D-955 and a minimum crystallization half-time of one minute or less, and situated between the surfacing and reinforcing mats.

Both the outer layers and the layer between the surfacing mat and the reinforcing mat may also have about 5 to about 50% by weight fillers selected from chopped strands of fiber glass of length less than about $\frac{1}{4}$ inch, milled glass, glass spheres, novacite, talc, mica, calcium carbonate, barium sulfate and kaolin.

Applications

The stampable reinforced thermoplastic polyester sheet would find applications principally in the automotive industry in exterior parts which require a smooth, glossy finish after painting and a high heat distortion temperature. It would also find utility in business equipment and computer housings.

The stamped sheet thus formed from the stampable sheet described above has a heat deflection temperature under 264 psi. load greater than $T_m$-50° C., where $T_m$ is the melting point of the outer layer of the sheet.

The invention has been described in detail with particular reference to preferred embodiments thereof, but it will be understood that variations and modifications can be effected within the spirit and scope of the invention.

We claim:

1. A stampable sheet of reinforced thermoplastic material having on at least one surface of the sheet a smooth surface suitable for use as exterior automotive panels and the like, said sheet comprising:
   - a plurality of layers of polymeric material and a plurality of layers of fibrous reinforcing material alternating with said layers of polymeric material, all of said layers being integrally formed together and the outer layers of said sheet being of a crystallizable material selected from poly(ethylene terephthalate), copolymers of poly(ethylene terephthalate) and blends thereof, poly(1,4-cyclohexanedimethylene terephthalate), copolymers of poly(1,4-cyclohexanedimethylene terephthalate) and blends thereof having a minimum crystallization half-time upon heating of one minute or less, the minimum crystallization half-time being that as measured with respect to each individual layer of said outer layers;
   - a layer of surfacing mat of fine stranded glass of continuous filaments randomly patterned, having a weight of about 0.1 to about 0.4 oz./sq. ft., and positioned contiguously with respect to one of said outer layers of said sheet; and
   - a layer of polymeric material positioned contiguously with the side of said surfacing layer opposite from said one of said outer layers of said sheet; having a shrinkage of less than about 2%, as determined in accordance with ASTM Method D-955, and a minimum crystallization half-time of one minute or less, and being selected from
     - a. copolymers of poly(1,4-cyclohexylenedimethylene 1,4-cyclohexanedicarboxylate) with about 10 to about 30 mole percent dimer acid;
     - b. a polyetherester comprised of
       - 1. a dicarboxylic acid component comprised of
         - A. 100 to 60 mole percent terephthalic acid, and
         - 0 to 40 mole percent of an aliphatic or aromatic dicarboxylic acid having a molecular weight of less than 300, and
       - 2. a diol component comprised of
         - A. a glycol comprised of 100 to 60 mole percent tetramethylene glycol and 0 to 40 mole percent of an aliphatic or aromatic glycol having a molecular weight of less than 300, and
         - B. 10 to 60 weight percent, based on the weight of the polyetherester, of a poly(alkylene oxide) glycol having 2, 3 or 4 carbon atoms in the repeating unit and having a molecular weight in the range of 400 to 5000, wherein the sum of the total mole percent amount of aliphatic or aromatic dicarboxylic acid having a molecular weight of less than 300 in item b.1.B, the mole percent amount of aliphatic or aromatic glycol having a molecular weight of less than 300 in item b.2.A., and the weight percent, based on the weight of the polyetherester, of the poly(alkylene oxide) glycol in item b.2.B. equals at least 25 but does not exceed 80;
     - c. a polyetherester comprised of
       - 1. a dicarboxylic acid component comprised of
         - A. 100 to 98 mole percent terephthalic acid, and
         - B. 0 to 2 mole percent of a trifunctional carboxylic acid of molecular weight less than 300;
       - 2. a diol component comprised of
         - A. a glycol comprised of 90 to 60 mole percent 1,4-cyclohexanedimethanol and 10 to 40 mole percent ethylene glycol or tetramethylene glycol, and
         - B. 10 to 50 weight percent, based on the weight of the polyetherester, of a poly(alkylene oxide) glycol having 2 to 4 carbon atoms in the repeating unit and having a molecular weight in the range of 400 to 2000;
     - d. a polyetherester comprised of
       - 1. a dicarboxylic acid component comprised of
         - A. 100 to 98 mole percent 1,4-cyclohexanedicarboxylic acid and
         - B. 0 to 2 mole percent of a trifunctional carboxylic acid of molecular weight less than 300;
       - 2. a diol component comprised of
         - A. 1,4-cyclohexanedimethanol and
         - B. 10 to 60 weight percent, based on the weight of the polyetherester, of a poly(alkylene oxide) glycol having 2 to 4 carbon atoms and a molecular weight in the range of 400 to 2000.

2. A stampable sheet as defined in claim 1 wherein item (c) comprises poly(about 70 to about 75 mole percent/about 30 to about 25 mole percent 1,4-cyclohexylenedimethylene/butylene terephthalate) modified with about 28 to about 33 weight percent poly(oxytetramethylene) of molecular weight 1000.

3. A stampable sheet as defined in claim 1 wherein (a) comprises poly(about 70 to about 75 mole percent/-about 30 to about 25 mole percent 1,4-cyclohexylenedimethylene/butylene terephthalate) modified with about 0.5 to about 0.8 mole percent (based on the acid component present) trimellitic anhydride and about 28 to about 33 weight percent poly(oxytetramethylene) of molecular weight 1000.

4. A stampable sheet as defined in claim 1 wherein item (d) comprises poly(1,4-cyclohexylenedimethylene 1,4-cyclohexanedicarboxylate) modified with about 0.25 to about 0.75 mole percent (based on the acid component present) trimellitic anhydride and about 22 to about 28 weight percent poly(oxytetramethylene) of molecular weight 1000.

5. A stampable sheet as defined in claim 1 wherein said outer layers have about 5 to about 50% by weight fillers selected from chopped strands of fiber glass of lengths less than about ¼ inch, milled glass, glass spheres, novacite, talc, mica, calcium carbonates, barium sulfate and kaolin.

6. A stampable sheet as defined in claim 1 wherein said layer of material contiguous to said one side of said surfacing mat has about 5 to about 50% by weight fillers selected from chopped strands of fiber glass of lengths less than about ¼ inch, milled glass, glass spheres, novacite, talc, mica, calcium carbonate, barium sulfate, and kaolin.

7. A stampable sheet as defined in claim 1 wherein said layers of fibrous reinforcing material are comprised of glass fiber.

8. A stampable sheet as defined in claim 7 wherein the overall thickness of said sheet ranges from about 40 to about 250 mils, and said layers of glass fiber comprise about 20 to about 50% by weight of said stampable sheet.

9. A stampable sheet as defined in claim 7 wherein the overall thickness of said sheet ranges from about 50 to about 150 mils, and said layers of glass fiber comprise about 20 to about 50 percent by weight of said stampable sheet.

10. A stampable sheet as defined in claim 7 wherein the overall thickness of said sheet ranges from about 60 to about 100 mils, and said layers of glass fiber comprise about 30 to about 40% by weight of said stampable sheet.

11. A stamped sheet of reinforced material from the stampable sheet of claim 1 and having a heat deflection temperature under 264 psi. load greater than $T_m$-50° C. where $T_m$ is the melting point of the outer layers of the sheet.

12. A stamped sheet as defined in claim 11 wherein said layers of fibrous reinforcing material are comprised of glass fiber.

* * * * *